United States Patent [19]
Roosen et al.

[11] Patent Number: 5,344,490
[45] Date of Patent: Sep. 6, 1994

[54] PLASTICISED GYPSUM COMPOSITION

[75] Inventors: Peter P. Roosen, Nanaimo; Gerard H. Koldyk, North Vancouver; Frank Pap, Richmond, all of Canada

[73] Assignee: Accuflex Products, Inc., North Vancouver, Canada

[21] Appl. No.: 110,920

[22] Filed: Aug. 24, 1993

Related U.S. Application Data

[63] Continuation of Ser. No. 875,181, Apr. 28, 1992, abandoned.

[51] Int. Cl.$^5$ ............................................. C04B 24/08
[52] U.S. Cl. ...................................... 106/778; 52/344; 52/177; 524/4
[58] Field of Search ............... 106/772, 774, 773, 778, 106/605, 646, 672; 52/344, 177; 524/4

[56] References Cited

U.S. PATENT DOCUMENTS

| | | | |
|---|---|---|---|
| 3,977,889 | 8/1976 | Shearing | 106/671 |
| 4,153,470 | 5/1979 | Stahl et al. | 106/680 |
| 4,902,348 | 2/1990 | Kossatz et al. | 106/780 |
| 4,939,191 | 7/1990 | Kataoka et al. | 106/692 |
| 4,940,844 | 6/1990 | Blunt | 106/634 |

Primary Examiner—Helene Klemanski
Assistant Examiner—Paul Marcantoni
Attorney, Agent, or Firm—Shlesinger, Arkwright & Garvey

[57] ABSTRACT

A composition comprising gypsum plasticized by a polymer and containing gypsum in the range of about 40% to about 90% by weight. In a preferred embodiment the polymer is polyurethane. A wide variety of applications of the composition are described.

38 Claims, No Drawings

PLASTICISED GYPSUM COMPOSITION

This application is a continuation, of application Ser. No. 07/875,181, filed Apr. 28, 1992, abandoned.

FIELD OF THE INVENTION

This invention relates to a composition comprising gypsum plasticised by a polymer.

DESCRIPTION OF THE PRIOR ART

Gypsum, which is the dihydrate of calcium sulphate, is a widely available compound. It is chemically inert. It is useful in the production of plaster and wallboard, the latter probably being the largest use of gypsum. Portland cement uses large quantities of gypsum. In agriculture, gypsum serves as a soil conditioner. Wallboard comprises a core of gypsum sandwiched between layers of paper. Although it is widely used, it does have disadvantages. It is not resistant to cracking nor to water. Although there are procedures available in the art to avoid these disadvantages, the known techniques are relatively expensive.

There is an increasing concern in society about the use of materials that are environmentally unacceptable. For example, in Canada there has been concern concerning the use of urea-formaldehyde foams in insulation. Largely because of incorrect polymerisation, formaldehyde was introduced into the air in private homes insulated with urea-formaldehyde foams, necessitating the expensive removal of these foams. There is, in any event, a far greater consciousness concerning the use of environmentally acceptable compounds in general than has previously been the case.

There is thus a need for producing a material of wide application that is environmentally acceptable. The material should not be toxic in any way and, as such, useful about the home and in the construction of the home. In this regard gypsum is considered ideal. It is a simple inorganic compound that is not toxic. However, the existing methods of treating gypsum, for example in the production of wallboards and the like as discussed above, have the disadvantages that the compound is rigid, tends to be brittle and has poor resistance to water.

Polymers are well known for their chemical inertness and wide variety of properties. Those properties can be varied by varying the components of the polymer or, in the case of homopolymers, by varying the amount of polymerization and thus the molecular weight of the polymer.

Polyurethanes are polymers that include the urethane group. The urethane linkage is formed by a reaction of hydroxyl and isocyanate groups. The high reactivity of isocyanates, together with knowledge of the catalysis of isocyanate reactions, make possible the relatively simple production of a wide range of polymers starting from low to moderate molecular weight, liquid starting materials.

Flexible and rigid polyurethane foams are the most widely available forms of polyurethane commercially available. These formulations typically include isocyanates and polyols with suitable catalysts, surfactants and blowing agents that produce the gas for foaming.

The great virtue of polyurethanes are that they are tough, have high load bearing capacity, good load temperature flexibility, resistance to a wide range of solvents and to oxygen, ozone, abrasion and mechanical abuse.

SUMMARY OF THE INVENTION

The present invention seeks to provide a gypsum composition having a number of interesting properties. The composition is useful in the formation of wallboards but can also be used as a treatment for wallboards to impart desirable characteristics. The invention has the great advantage of providing a composition of great interest commercially but being virtually non-toxic, easy to produce and, depending on the choice of components, of widely varying characteristics.

STATEMENT OF THE INVENTION

Accordingly, and in its broadest aspect, the present invention is a composition comprising gypsum plasticised by a polymer and containing gypsum in the range of about 40% to about 90% by weight.

The polymer may be a polyester but in a particularly preferred embodiment the polymer is polyurethane.

In a particularly preferred aspect the composition of the invention is derived from a mixture of the components (a) a polymerisable isocyanate and (b) a mixture of gypsum and a polyol.

The mixture preferably contains about 5 to 17% by weight isocyanate, the balance being the gypsum and the polyol. In a particularly preferred embodiment the polyol is a glyceride, for example a vegetable oil. The particularly preferred vegetable oil is castor oil.

Any isocyanate can be used that is known in the polyurethane art to polymerise with hydroxyl-containing compounds. However the preferred isocyanate is one containing 4,4'-diphenylmethane diisocyanate (MDI) alone or in combination with its 2,2'-isomer or, preferably polymethane polyphenyl isocyanate. Preferably, the MDI comprises about 30 to 60% by weight of the combination.

The mixture may include functional additives. For example, a pigment may be present in the amount of about 2% by weight of component (b). Pigments include titanium dioxide and carbon black. A wide range of pigments are known commercially.

Because of the effect of water on the isocyanate it is desirable that the compositions include a dessicant to prevent adverse effects. The dessicant may be present in about 1% by weight of component (b). A typical dessicant is a synthetic zeolite.

Although the composition of the invention will cure, it is preferable to include an accelerator to speed curing. These accelerators include tertiary amines, for example dimethylethanolamine (DMEA), or an organometallic compound, for example, dibutyltindilaurate (DBTL).

If desired, a blowing agent may be incorporated. These blowing agents react with the isocyanate to produce carbon dioxide. A small volume of water can be added, or an alcohol.

In a particularly preferred embodiment, the cured composition is derived from a mixture comprising the components (a) isocyanate and (b) gypsum and castor oil. Gypsum is preferably present in the range of 50 to 90% by weight of component (b) the balance of component (b) being the castor oil.

Component (b) may include about 2% by weight of a pigment and/or about 1% by weight of a dessicant. The castor oil component is reduced in proportion accordingly.

The ratio of (a) to (b) is typically in the range 14:86 to 20:80, preferably 15:85 to 18:82 and, in a particularly preferred embodiment, 17:83 especially where component (b) contains 50% gypsum. Higher gypsum in component (b) leads to a proportional variation in component (a).

When additives are to be added it is desirable to incorporate them into component (b), that is the mixture of gypsum and the polyol, preferably castor oil. The isocyanates are relatively reactive and thus easily contaminated. Therefore the introduction of the additives through the mixture of gypsum and polyol is considered good practice. It also reduces the amount of equipment required to formulate the mixture because all the blending is done in one piece of equipment and the gypsum and the polyol must be stirred with a high shear mixer to mix those essential ingredients.

The composition has the great virtue of very large tolerances in the ratio of the components (a) and (b). An initial approach is to set the ratio of castor oil to isocyanate at about 2 to 3:1 to provide a good polymerisation. The remaining ingredients, including the gypsum, can be varied widely to produce a wide range of different products. For example a ratio of (a) to (b) of 1:5 (for 50% gypsum in component (b)) produces a flexible polymer that has many mechanical properties similar to wood. When the ratio is varied to 15:85 or even further to a 14:86 ratio the products are more rubbery in properties. In contrast moving the ratio in the direction of 20:80 produces a much harder product. In general it is not desirable to proceed in the direction of a hard product as this introduces more unreacted isocyanate groups. These may react with moisture over time to produce a product that becomes too brittle. Further, the isocyanate is the most expensive component in the mixture and, for that matter, the only component having any sort of toxicity, mild though it is. In these circumstances, the preferred range of ratio (a):(b) is 18:82 to 15:85. This is about a 20% variation in the amount of isocyanate, a large variation.

The mixture of gypsum and polyol may have wide variations. The gypsum content can vary from 50% to about 90% of component (b). The latter produces a finished product that is about 75% gypsum and still flexible. In general gypsum content in the final composition is in the range of about 40% to about 90% by weight. The ratio of castor oil to isocyanates should, in any event, be kept in the range 2 to 3:1. The additives are not critical. As indicated they are used in small amounts and, indeed, need not be used at all. The dessicant is only required to overcome free moisture found in the ingredients. Drying the ingredients prior to blending eliminates the necessity for a dessicant. However, it has been found that adding the dessicant is the cheapest and simplest way to remove free moisture.

Addition of one or more accelerators is not essential as the product will cure whether or not such a component is present. However, the free curing time is in excess of 24 hours at room temperature which for most commercial applications is too long. In these circumstances, accelerators can be used to reduce the cure time greatly. A minimum cure time has been determined to be about 17 seconds using dibutyltindilaurate (DBTL). This, of course, can be excessive in many applications. A combination of DBTL and DMEA has been found to produce a cure at a slower rate thus providing a longer pot life.

Plasticizing oils may be incorporated if required. Electrically conductive material may be added for special applications and metallic flakes may be added for particular visual effects. Materials to resist the effects of ultra-violet radiation and anti-oxidants may also be incorporated.

Further materials such as abrasives, carbonates, boron components for fire resistance can be added for different effects (such as higher absorbtion resistance strength). Cellulose and glass fibre can also be used as fillers. Toxins such as copper sulphate can be added to applications such as marine bottom parts to prevent fouling.

The composition may include water as a blowing agent. This produces a gypsum based foam of high insulation ability. For example 0.2 mls of water will produce 300% free expansion of about ¼ kilogram of polyurethane composition according to the invention. Retarders can be added if necessary.

Production of the composition according to the present invention is straightforward. The preferred components have a number of desirable characteristics that make their processing into a polymer composition simple. The following procedure has proved useful:

Gypsum and any other powders present are metered from hoppers using low speed metering screws. These powders are fed into the top of a 1750 rpm blending screw. Castor oil is injected into the side of the blending screw. The rough mixture exits the screw and enters an inclined second screw, operating at about 1750 rpm.

The smooth mixture exits the second screw and is drawn into a gear pump. The gear pump helps clear the second screw. The finished liquid is fed from the pump under pressure to a storage tank.

The isocyanate is stored separately in a lidded container.

To produce a polymer the mixture of gypsum and castor oil is fed into a tank. Accelerators, pigments and the like additives may be added to the tank, which is stirred and recirculated through twin process pumps.

Isocyanate is stored in a second tank. As indicated above generally there are no additives in the second tank and moisture from the atmosphere is prevented from entering. This tank is also stirred and recirculated through the process pumps.

The two components from the first and second tanks are fed separately through a pair of gear pumps which are geared together at a pre-set ratio of 1 to 5 parts of isocyanate to the mixture of gypsum and castor oil. The gear pumps are driven by a common, variable speed drive which is operator controlled. The pumps serve to meter and pressurize the two parts of the composition when castings are being poured. When the castings are not being poured, the pumps recirculate the two components back to their respective tanks while, of course, maintaining the set 1 to 5 ratio.

The output from the pumps enters a pair of three diverter valves which are operated separately. The valves either send the components to the mixer head or back to their respective tanks.

The two components, the isocyanate on one hand and the mixture of gypsum and castor oil on the other, are brought together at a mixer head which is a motorized screw, operable at 3500 rpm, with inlet ports for each of the components. The mixer blends the two components which have been metered by the process pumps while the molds are being filled.

The properties of the composition make the process extremely simple.

The mixer is extremely easy to flush out by simply diverting the isocyanate back to the tank while letting the other side, with the gypsum and the castor oil, run through the mixer head for a few seconds. No special flushing equipment is required. The gypsum is soft. It has a hardness on the Mohs scale of about 2. It therefore does not wear out the processing equipment. Castor oil obviously functions as a lubricant in the process. Furthermore titanium dioxide can act as a dry lubricant. The dessicant removes any free moisture, thus avoiding the possibility of corrosion. There is no necessity to use expensive anti-corrosion fittings.

The following examples illustrate the invention.

EXAMPLE 1

41 parts by weight gypsum
17 parts by weight isocyanate
39 parts by weight castor oil
2 parts by weight TiO$_2$
1 part by weight zeolite

EXAMPLE 2

The apparatus described above was used to mix a composition comprising:

| | |
|---|---|
| 175 | parts by weight gypsum |
| 15 | parts by weight isocyanate |
| 39 | parts by weight castor oil |
| 3 | parts by weight titanium dioxide |
| 2 | parts by weight zeolite |
| 235 | |

The temperature was kept below 90° C. Accelerators were not used but could be added depending on the physical characteristics required. The resulting product has the consistency of bread dough.

Physical Characteristics

The above composition (example 1) that is before curing, had the following physical characteristics:

| Colour | Creamy Tan | |
|---|---|---|
| Pot Life 100 grams at 23 Degrees C. (easily varied) | Less than 20 Minutes | |
| Recommended Cure Cycle | 24 Hours at 23 Degrees C. | |
| Mixed Viscosity at 23 Degrees C. | 2000–3000 CPS | |
| Resin Viscosity at 23 Degrees C. | 200 CPS | |
| Catalyst Viscosity at 23 Degrees C. | 6000–10000 CPS | |
| Specific Gravity (Approximate) | Isocyanate | 1.2 |
| | gypsum & castor oil | 1.4 |
| (Mixed S.G. depends on blowing) | Mixed (Max) | 1.4 |
| Estimated Tensile Strength | 1300 PSI | |
| Estimated Elongation | 100% | |

The cured product had the following characteristics:

| | |
|---|---|
| Colour | Creamy tan to yellow. |
| Flexibility | Easily bent with a programmable memory due to creep. |
| Machinability | Similar to wood; all normal woodworking tools can be used to finish the cured material. |

This material sands, saws, planes and nails quite easily. Tool life is high unless an abrasive fill is added.

| | |
|---|---|
| Odour | This material contains no volatile solvents. It is a vegetable oil-derived plastic which has a pleasant natural odour prior to curing which is quite mild. The odour disappears once the material is fully cured. |
| Fire | The material is self-extinguishing. More gypsum leads to increased fire resistance. |
| Water Resistance | High resistance to water, sea-water, hot or cold. |
| Solvent Resistance | High resistance to most common petro-chemical solvents. One noted exception is p-styrene monomer. |
| Ultra-Violet Radiation | UV causes the material to become more yellow in colour after prolonged exposure. No significant changes to mechanical properties have been found. |
| Maintenance | Easy to clean dirty floor with most selvents and detergents. |
| Adhesion | Bonds to wood, concrete, itself, asphalt, tar and paints. |

General Properties

Shrinkage and expansion is negligible. If it should be desired the product may be varied to incorporate expansion. For example addition of water will create an omni-directional expansion as carbon dioxide is produced in a foaming reaction. Addition of excess desiccant will cause some shrinkage.

The curing has a mild exotherm. The amount of heat liberated during curing is much less than in most other two-part, or even water-cure, systems. Due to the mild exotherm and the lack of shrinkage, large castings and molds can be produced with a small number of lifts. A lift is the term used to describe a pour in a series of pours gravity fed into a single mold.

The product is of desirable casting characteristics because of the ease of varying the cure. Cure rates can be varied by mixing different amounts of accelerator, as defined above and by changing ambient temperatures.

The product has excellent detailing characteristics. That is it follows patterns and mold detail extremely well, producing intricate pieces well.

The product can polymerize into itself. This means that molds can be built up in pieces, repairs can be made and the like. This is a very important characteristic in a number of applications.

EXAMPLE 3

The same procedure as in Example 2 was followed but the composition was:
175 parts by weight gypsum
17 parts by weight isocyanate
39 parts by weight castor oil
3 parts by weight titanium dioxide
2 parts by weight zeolite The slight increase in isocyanate produced a more rigid sheet. This more rigid sheet could be used for flooring or roofing sheeting. It is also appropriate as a replacement for current gypsum wallboards in some areas, particularly wet areas such as in showers stalls.

It is envisaged that chopped fibre-glass or some other known reinforcement material could be incorporated if there is there a high localized loading, for example on a roof or floor.

Applications

It is believed that the composition of the present invention will find particular application in the production of wallboards, sometime referred to as gypsum board. Using the composition of the present invention, boards can be produced that are cheap and easy to produce, fire-resistant, water-proof, flexible for use in curved stair-wells, walls and the like, able to take all standard finishes, structurally sound and easy to install and work. Although the present gypsum boards are widely used in construction largely because they are both fire-resistant and cheap and easy to produce, they are not water-proof nor are they flexible. There is not presently a single commercial product that meets all of the above requirements. However, the present composition is particularly desirable in this regard.

Wallboard Type 1

This aspect of the invention simply involves applying a coating of a composition according to the present invention onto the finished existing gypsum wallboard. Experiments in this regard have shown:

The modified board is easy and cheap to produce. It is simply necessary to apply about 1/16 inch thick coating of the plasticized gypsum onto the current board on existing production lines. The material may be applied by spray, roll, curtain or other coating machines added to the existing production lines.

The boards have excellent fire-resistance. It is not believed that existing ratings for gypsum boards will change. The coating is also fire-resistant due to the water content of the gypsum which is, of course, a dihydrate. The coating is water-proof. The prior art board to which the coating is applied is not but the coating is undoubtedly completely water-proof.

The board can be made flexible. By wetting the back of the sheet to soften the gypsum, the coated sheet bends into the desired curvature. It dries to retain the new shape. On existing boards the paper coating tears and creases easily, making it difficult and time-consuming to build curved walls. However the plasticized composition according to the invention does not tear easily. It appears to have the ability to relieve internally stress concentration points that develop during the bending process.

The coated board accepts all standard finishes.

The board is structurally sound. It has the same ability in this regard as the prior art sheets with a marginal increase in strength due to the coating.

A standard wallboard with a thin coating, approximately 0.015 inches, might well be an economical and environmentally attractive alternative to the asphalt coated exterior sheets presently being used because of their water-resistance.

Type 2 Wallboard

As a replacement for the existing boards, with their paper surfaces, the plasticized gypsum according to the present invention can be extruded then rolled as a dough-like material into finished wallboard. This approach has been technically successful using the following composition:
175 parts by weight gypsum
15 parts by weight isocyanate
39 parts by weight castor oil
3 parts by weight titanium dioxide
2 parts by weight zeolite The composition contains about 75% by weight of gypsum and has a consistency similar to bread dough. The composition is made by blending the components together in a compounder/extruder screw with a temperature maintained at a level that does not exceed 90° C. Addition of DBTL, alone or with other accelerators, may be required depending on the rolling mill and the extruder characteristics. The composition is rolled through a series of rollers then sized and cut. The product eliminates a need for paper or other backings although a backing may be added if desired.

The rolling operation can be replaced by pressing. The rolling operation has been shown to impart consistent, bi-directional elongation of the dough. In contrast, the pressing operation produces uneven elongation.

The finished sheet has excellent surface finish, is completely water-proof, takes all finishes, cuts, sands, machines well, is fire-resistant, takes nails and screws, is flexible, has good strength (approximately 1000 pounds per square inch tensile strength) and is easy to handle.

The above Type 2 wallboard was varied by using the following formula:
175 parts by weight gypsum
17 parts by weight isocyanate
39 parts by weight castor oil
3 parts by weight titanium dioxide
2 parts by weight zeolite.

The resulting sheet was more rigid and usable as flooring or roofing sheathing. It was also found to be a desirable replacement for prior art gypsum wallboards particularly in areas where water would be encountered, for example shower walls.

Experiments show that chopped fibre glass, or similar reinforcements, can be incorporated into the material where there is a high localized loading expected, for example on a roof or a floor.

The sheathing could also serve as the exposed surface on a roof and the same composition according to the present invention can be used to seal the joints and nail holes produced during the roofing process.

Type 3 Board

Wafer boards or chip boards are produced by squeezing wood chips or wafers together with an adhesive. Preferably the adhesive is water-proof. The finished, cured board is inexpensive and is quickly replacing plywood in the market place. This is largely because plywood is an inefficient use of wood and is also costly.

Although the existing wafer, chip and particle boards are cheap to produce, such a board using the composition of the present invention has improved properties particularly in higher water resistance, higher fire resistance, smoother surface and a higher nail and breaking strength.

In the circumstances, the composition of the present invention can be rolled or pressed with wood chips and would act as both the binder and the filler. The resulting composition has the strength of wood with a much smoother and sandable surface. The board using the composition of the present invention has better water resistance, fire resistance and is stronger.

Molded Parts

The composition of the present invention makes an excellent moldable composition and is desirable in the molding of trim, for example baseboards, crown moldings, chair rails, panel molds and detailed parts from long wood patterns. The patterns are typically 12 to 16 feet long, 1 to 7 inches wide and about ¼ to 1 inch thick. They have a flat back which is in contact with a wall when the trim is installed.

To produce a mold the patterns are first dried out. This is achieved by heating at about 40° to 60° C. for a few hours. This also has the virtue of drying out any air bubbles as well as moisture. If the patterns are not dried, the finished mold will occasionally have bubbles on the surface which results in surface defects on any finished produced from the mold.

The molds are made by nailing the pattern into the bottom wooden tray, about 16 feet long. The ends are blocked and a sealer coat is applied. Sealer coats are known. A sealer coat may, for example, be a urethane spray paint. A mold release is applied. Again these compounds are known. They are waxes or polymers with an extremely smooth surface, for example, silicones and polytetrafluoroethylene (PTFE). A castable material is then poured into the tray. The castable material, which forms a mold, is cured and stripped.

A modified composition according to the present invention has been found to be ideal as the castable material to produce a mold. The composition was:
about 30 parts by weight isocyanate;
about 60 parts by weight castor oil;
about 1 parts by weight zeolite; and
about 2 to 4 drops per kilogram of DBTL as accelerator.

The finished mold is generally slow cured for about 24 hours.

Other compositions may also be used to form the mold. For example silicone rubber available under the Trade-mark 3110 RTV from Dow Corning makes an excellent mold that does not require a release agent when filled in production or with a similar formula. However, the cost of the silicone rubber is approximately 6 times that of the composition defined above.

To produce the architectural trim, the production line uses a long series of roller tables along which the mold travels. The production follows the following sequence:

(1) Mold release is applied to the mold, typically by spraying. A wet type release agent, which is waxed based, is preferred, primary due to the low cost and the zero delay prior to mold filling.

(2) The mold is filled with a plasticized gypsum according to the present invention. The composition flows out of a mixer nozzle into the open mold as the mold travels past the nozzle along the roller table.

(3) The mold is cured. Cure time may vary between 17 seconds to 1 hour, depending entirely on the amount of accelerator, operator needs and ambient temperature. Heating increases the cure rate for a given amount of accelerator.

(4) The filled, cured mold travels along the roller table and into a mill which mills down the upper surface of the composition according to the present invention, that is to say that part of the molding that will eventually be the back surface of the trim. Milling is not essential if the mold filling is well controlled.

(5) The finished trim is stripped from the mold. The mold is then returned to the mold release application station. The finished pieces are trimmed, package, inspected and shipped. They are shipped in rolls due to the flexibility of the composition.

Autobody Filler

A composition according to the present invention has proved ideal as an autobody filler. The following composition has been used:

Part "A"
about 30 parts by weight gypsum
about 17 parts by weight isocyanate
about 1 part by weight desiccant
about 2 parts by weight TiO2

Part "B"
about 70 parts by weight gypsum
about 39 parts by weight castor oil
about 1 part by weight desiccant
about 2 parts by weight TiO2

The above composition is mixed together in proportions of about 3 parts Part B to 1 part A. The pastes are blended together with a putty knife or stirred, precisely as with current autobody fillers. The composition is flexible and extremely adherent to metal.

Spray Foam

A water blown composition according to the present invention foam is expanded about 300% to produce a fire-resistant insulation foam which is sprayable and has some fire-resistance. The foam finds application in commercial insulations systems, sound dampening and cavity filling, for example inside hollow doors or boat hulls.

Wallboard Filler Mud

The plasticized gypsum of the invention makes a totally water-proof paste which can be used for joint fillings. It can be used to fill the joints between wallboards, roof panels and for crack filling, plumbing repair, sundeck repairs, roof leak repairs and caulking. For a water-proof gypsum wall it is essential to have a water-proof joint filler.

Roof Coating

The plasticized gypsum of the invention makes a good roof coating in place of tar and gravel. It does not melt on a hot day nor crack or blister on a cold day. It remains flexible to allow for roof expansion and contraction. It is easy to apply by mixing and pouring or by spraying. No propane burners are required and oil products are not used.

Sun Deck Coating

The composition is used precisely as for the above roof coatings. The composition can be pigmented. A two-part sundeck coating kit is envisaged. Such a kit can be sold at a Hardware Store and the sundeck installed by simply mixing and pouring the composition. The composition can be applied by roller, brushes, trowels or the like.

Floor Seal

The composition can be used as an industrial covering for concrete floors. The coated floors have the following benefits:

(1) Resilience. Furthermore a slight foaming, for example 20%, improves the resilience yet still produces a tough floor. This can reduce back-ache.

(2) The product has some insulation capabilities.

(3) The product has high chemical resistance when applied to concrete and asphalt, a particular virtue over asphalt floors.

(4) The composition is dust free.

(5) The composition is tough.

(6) The composition is easily repairable. It is simply required to pour more of the composition into an area being patched.

(7) The composition is inexpensive. It is estimated to be approximately a quarter of the cost (at the retail price level) of the current epoxy flooring used for industrial floors.

(8) The composition is flexible and will thus not crack at joints.

It is believed that a particularly desirable application will be for the coating for asphalt to improve the chemical resistance of asphalt floors.

Movie Sets

Movie props and parts can be produced in quantity using the molding composition of the invention.

Ornamental Castings

Small intricate parts are easily produced with faithful reproduction of the details of a pattern.

Road Lines

The composition of the present invention is an excellent product for making road lines and markers, for example nodules and the like. The advantages over paint include:

(1) There is some polymerization into asphalt and excellent bond to concrete.

(2) The composition is resilient which means that it will outlast paint by a considerable margin.

(3) Its thickness produces a bump which can be felt by a driver. This leads to more alert driving and, in particular, warns a driver when the car reaches the edge of a lane.

(4) The cure time can be very short, less than 1 minute. This makes it possible to eliminate the need to place and pick-up traffic cones during line painting operations.

Polystyrene Coatings and Adhesives

The composition has excellent coating characteristics for polystyrene. The foam does not break down and a good mechanical bond is formed. A smooth surface is easily produced and the coating is easily applied to foam surfaces. The resulting product can be used to make roof panels, marine floats, ceiling panels and wall panels.

The plasticized gypsum also makes an excellent adhesive for bonding pieces of foam together and for bonding foam to concrete. It can make a good general purpose adhesive that can be used to bond together pieces of wood.

Marine Use

The composition of the invention can be used as structural material. The plasticized gypsum can be used wherever fibre glass or epoxy resins are used. It can be used as a structural material, deck coating, a hull liner, a bottom paint or for bumpers. For deck coatings, or indeed for any other floor coating, fills such as sand can be added or sprinkled on the coating during the curing. Crushed nut shells, for example walnuts shells, also perform this function.

Wood Coatings and Bindings

The cellulose in wood provides a number of hydroxyl groups that polymerize into the plasticized gypsum of the invention. This means that as a covering for wooden floors, or a wood binder, the material bonds exceptionally well. Cellulose can, indeed, be used as a filler in the plasticized gypsum of the invention.

Thus the present invention provides a composition that is easy to produce, can be worked easily and has a wide variety of applications stemming from its wide variety of desirable physical properties, low cost and high simplicity in application.

We claim:

1. A cured composition derived from a mixture comprising the dry components:
   (a) a polymerisable icocyanate; and
   (b) gypsum and castor oil, the gypsum being present in the range 50% to 90% by weight in component (b), the balance being the castor oil;
   the composition containing isocyanate in the range of about 5% to 20% by weight.

2. A composition as claimed in claim 1 in which component (b) includes about 2% by weight of a pigment, about 1% by weight of a dessicant, the castor oil component being reduced in proportion accordingly.

3. A composition as claimed in claim 1 in which gypsum is present as 50% by weight of component (b) and in which the ratio (a):(b) is in the range 14:86 to 20:80.

4. A composition as claimed in claim 3 in which gypsum is present as 50% by weight of component (b) and in which the ratio (a):(b) is in the range 15:85 to 18:82.

5. A component as claimed in claim 4 in which gypsum is present as 50% weight of component (b) and in which the ratio (a):(b) is 17:83.

6. A composition comprising gypsum plasticised by a polyurethane and derived from a mixture of the dry components:
   (a) a polymerisable isocyanate; and
   (b) a mixture of gypsum and a glyceride containing gypsum in the range of about 40% to about 90% by weight, the balance being the glyceride; the composition containing component (a), the isocyanate, in the range of about 5% to about 20% by weight.

7. A composition as claimed in claim 6 in which the mixture of the components contains about 17% isocyanate, the balance being substantially equal amounts of gypsum and the glyceride.

8. A composition as claimed in claim 6 in which the glyceride is a vegetable oil.

9. A composition as claimed in claim 8 in which the vegetable oil is castor oil.

10. A composition as claimed in claim 1 in which the isocyanate is a mixture of 4,4'-diphenylmethane diisocyanate (MDI) and polymethane polyphenyl isocyanate.

11. A composition as claimed in claim 10 in which the MDI comprises about 30 to 60% by weight of the mixture.

12. A composition as claimed in claim 6 that includes a pigment.

13. A composition as claimed in claim 12 in which the pigment comprises about 2% by weight of component (b).

14. A composition as claimed in claim 13 in which the pigment is titanium dioxide, 15. A composition as claimed in claim 6 that includes a dessicant.

16. A composition as claimed in claim 15 in which the dessicant is present in about 1% by weight of component (b).

17. A composition as claimed in claim 15 in which the dessicant is a synthetic zeolite.

18. A composition as claimed in claim 6 that includes an accelerator to speed curing.

19. A composition as claimed in claim 18 in which the accelerator is a tertiary amine.

20. A composition as claimed in claim 19 in which the tertiary amine is dimethylethanolamine (DMEA).

21. A composition as claimed in claim 18 in which the accelerator is an organometallic compound.

22. A composition as claimed in claim 21 in which the organometallic compound is dibutyltindilaurate (DBTL).

23. An article of manufacture comprising, a composition comprising gypsum plasticised by a polyurethane and derived from a mixture of the components:
(a) a polymerisable isocyanate; and
(b) a mixture of gypsum and a glyceride containing gypsum in the range of about 40% to about 90% by weight, the balance being the glyceride;
the composition containing component (a), the isocyanate, in the range of about 5% to about 20% by weight.

24. An article of manufacture comprising a cured composition derived from a mixture comprising the components:
(a) a polymerisable isocyanate; and
(b) gypsum and castor oil, the gypsum being present in the range 50% to 90% by weight in component (b), the balance being the castor oil;
the composition containing isocyanate in the range of about 5 to 20% by weight.

25. An article as claimed in claim 24 in the form of a wallboard.

26. An article as claimed in claim 24 wherein the composition comprises:
175 parts by weight gypsum;
15 parts by weight isocyanate;
39 parts by weight castor oil;
3 parts by weight titanium dioxide; and
2 parts by weight zeolite.

27. An article as claimed in claim 24 in the form of wallboard mud.

28. An article as claimed in claim 24 in the form of a foam, foaming being induced by introducing water into the composition.

29. An article as claimed in claim 24 in the form of an auto-body filler.

30. An article as claimed in claim 29 in which the filler composition is in two parts: part (a) comprising about 30 parts by weight gypsum, about 17 parts by weight of MDI, about 1 part by weight of dessicant and about two parts by weight titanium dioxide, and part (b) comprising about 70 parts by weight gypsum, about 39 parts by weight castor oil, about 1 part by weight dessicant and about 2 parts by weight of titanium dioxide, the components being mixed in the proportions one part by weight of (a) to three parts by weight of (b).

31. An article as claimed in claim 24 in the form of a roof coating.

32. An article as claimed in claim 31 in which the polymer composition is produced from the composition:
175 parts by weight gypsum;
17 parts by weight isocyanate;
39 parts by weight castor oil;
3 parts by weight titanium dioxide; and
2 parts by weight zeolite.

33. An article as claimed in claim 24 in the form of floor covering.

34. An article as claimed in claim 33 in which the floor covering is a sun-deck covering.

35. An article as claimed in claim 24 in the form of a road line.

36. An article as claimed in claim 24 in the form of a marine coating.

37. An article as claimed in claim 24 in the form of a wood coating.

38. A composition consisting of gypsum plasticised by a polyurethane and derived from a mixture of the components:
a) a polymerisable isocyanate; and
b) a mixture of gypsum and a glyceride containing gypsum in the range of about 40% to about 90% weight, the balance being the glyceride;
the composition containing component (a), the isocyanate, in the range of about 5% to about 20% by weight.

* * * * *